United States Patent
Wu et al.

(10) Patent No.: US 10,872,581 B2
(45) Date of Patent: Dec. 22, 2020

(54) ELECTRONIC DEVICES WITH ORIENTATION COMPENSATION

(71) Applicant: Apple Inc., Cupertino, CA (US)

(72) Inventors: Jiaying Wu, San Jose, CA (US); Cheng Chen, San Jose, CA (US); Hung A. Pham, Oakland, CA (US); Lu Zhang, Campbell, CA (US); Paul V. Johnson, San Francisco, CA (US); See-Ho Tsang, Cupertino, CA (US); Steven P. Hotelling, Los Gatos, CA (US); Wesley S. Smith, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/979,324

(22) Filed: May 14, 2018

(65) Prior Publication Data
US 2019/0035356 A1    Jan. 31, 2019

Related U.S. Application Data

(60) Provisional application No. 62/537,889, filed on Jul. 27, 2017.

(51) Int. Cl.
*G09G 5/02* (2006.01)
*G06F 3/16* (2006.01)

(52) U.S. Cl.
CPC .............. *G09G 5/02* (2013.01); *G06F 3/165* (2013.01); *G09G 2320/0666* (2013.01); *G09G 2354/00* (2013.01); *G09G 2360/144* (2013.01)

(58) Field of Classification Search
CPC .......... G09G 2354/00; G09G 2360/144; G06F 1/165; G06F 3/0481; G06F 3/16; G06F 3/011; G06F 3/012; G06F 3/013
See application file for complete search history.

(56) References Cited

U.S. PATENT DOCUMENTS

| | | | |
|---|---|---|---|
| 8,638,344 B2 | 1/2014 | Jaramillo et al. | |
| 8,749,591 B2 * | 6/2014 | Baba | G09G 3/3413 345/102 |
| 9,274,597 B1 | 3/2016 | Karakotsios et al. | |
| 9,442,564 B1 * | 9/2016 | Dillon | G06F 3/012 |
| 9,704,216 B1 | 7/2017 | Laskar et al. | |

(Continued)

*Primary Examiner* — Antonio A Caschera
(74) *Attorney, Agent, or Firm* — Treyz Law Group, P.C.; G. Victor Treyz; Matthew R. Williams (57) ABSTRACT

An electronic device may have components that experience performance variations as the device changes orientation relative to a user. Changes in the orientation of the device relative to the user can be monitored using a motion sensor. A camera may be used to periodically capture images of a user's eyes. By processing the images to produce accurate orientation information reflecting the position of the user's eyes relative to the device, the orientation of the device tracked by the motion sensor can be periodically updated. The components may include audio components such as microphones and speakers and may include a display with an array of pixels for displaying images. Control circuitry in the electronic device may modify pixel values for the pixels in the array to compensate for angle-of-view-dependent pixel appearance variations based on based on the orientation information from the motion sensor and the camera.

18 Claims, 7 Drawing Sheets

(56) References Cited

U.S. PATENT DOCUMENTS

| | | | |
|---|---|---|---|
| 9,727,790 B1* | 8/2017 | Vaziri | G06F 3/012 |
| 10,187,569 B2* | 1/2019 | Liu | G06T 3/4038 |
| 2007/0035536 A1* | 2/2007 | Alessi | G09G 3/20 |
| | | | 345/207 |
| 2014/0333670 A1 | 11/2014 | Agnetta et al. | |
| 2015/0177906 A1* | 6/2015 | Yairi | G06T 3/0006 |
| | | | 345/648 |
| 2017/0278218 A1* | 9/2017 | Carpenter | G06F 3/013 |

* cited by examiner

ELECTRONIC DEVICES WITH ORIENTATION COMPENSATION

This application claims the benefit of provisional patent application No. 62/537,889, filed Jul. 27, 2017, which is hereby incorporated by reference herein in its entirety.

FIELD

This relates generally to electronic equipment, and, more particularly, to electronic devices having components that vary in performance depending on their orientation.

BACKGROUND

Electronic devices such as cellular telephones and other electronic devices sometimes have displays, speakers, microphones, and other components. The performance of these components can vary as a function of their orientation with respect to a user. As an example, stereo sound can become unbalanced as a user moves away from one speaker and towards another speaker in a stereo sound system. As another example, the color of pixels in a display may vary as a function of viewing angle.

These variations can degrade device performance by creating undesired audio and visual artifacts as the orientation of a device changes with respect to a user.

SUMMARY

An electronic device may have components that experience performance variations as the device changes orientation relative to a user. Sensor circuitry may monitor the orientation of the device relative to the user. Using this information, control circuitry in the electronic device may compensate for the performance variations.

The sensor circuitry may include a motion sensor with which the orientation of the device can be monitored. The motion sensor may include an accelerometer, a gyroscope, and/or a compass. As the device is moved, the motion sensor may track changes to the orientation of the device. A camera may be used to periodically capture images of a user's eyes. By processing the images to produce accurate information on how the device is orientated with respect to the user's eyes, the changes in the orientation of the device that are tracked by the motion sensor can be periodically updated (e.g., periodically calibrated), thereby maintaining continuous information on the orientation of the device relative to the user.

The components that exhibit performance variations may include audio components such as microphones and speakers and may include a display with an array of pixels for displaying images. Control circuitry in the electronic device may modify pixel values for the pixels in the array to compensate for angle-of-view-dependent pixel appearance variations. Pixel value modifications may be made dynamically based on the orientation information from the motion sensor and the camera or other sensor circuitry. Pixel value modifications may be made differently across the array of pixels in accordance with the different angles of view for these pixels relative to the user.

In some arrangements, color corrections and other image adjustments may be made by the control circuitry based on color ambient light sensor information from a color ambient light sensor in the electronic device in addition to orientation information. The control circuitry may also modify audio channel output gains and audio channel input gains to compensate for orientation changes of audio components relative to the user.

DETAILED DESCRIPTION

An electronic device may have components such as audio components and displays that have performance characteristics that vary as a function of distance and angular orientation. To accommodate changes in the orientation of an electronic device relative to a user, sensors in the electronic device may be used in measuring the orientation of the electronic device relative to the user so that dynamic compensating adjustments may be made to the components.

Figure 1:
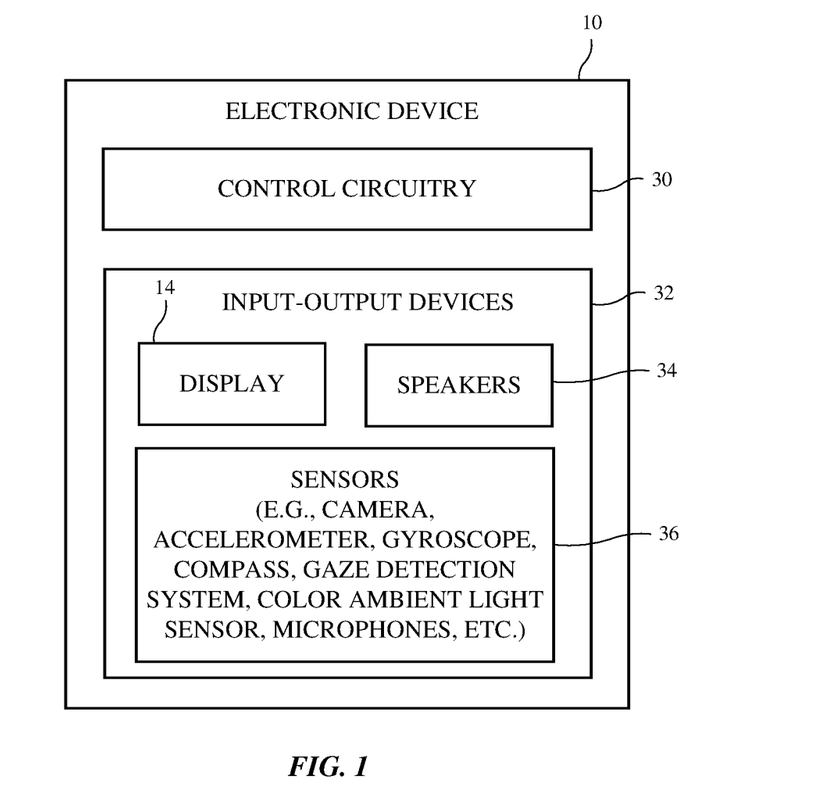
FIG. 1 is a schematic diagram of an illustrative electronic device in accordance with an embodiment.

A schematic diagram of an illustrative electronic device of the type that may include circuitry for making dynamic orientation-based compensating adjustments is shown in FIG. 1. Electronic device 10 of FIG. 1 may be a cellular telephone, a laptop computer, a tablet computer, a media player, or other handheld or portable electronic device, a smaller device such as a wrist-watch device (e.g., a watch with a wrist strap), a pendant device, a headphone or earpiece device, a device embedded in eyeglasses or other head-mounted equipment worn on a user's head, or other wearable or miniature device, a computer display containing an embedded computer, a computer display that does not contain an embedded computer, a gaming device, a navigation device, an embedded system such as a system in which electronic equipment with a display is mounted in a kiosk or automobile, a remote control, a voice-controlled internet-connected speaker (e.g., an artificial intelligence assistance device, home assistant, etc.), a set-top box, equipment that implements the functionality of two or more of these devices, or other electronic equipment.

As shown in FIG. 1, electronic device 10 may include control circuitry such as control circuitry 30. Control circuitry 30 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 30 may be used to control the operation of device 10 (e.g., controlling electrically adjustable components, displaying images on a display, etc.). The processing circuitry may be based on one or more microprocessors, microcontrollers, digital signal processors, baseband processors, power management units, audio chips, application specific integrated circuits, etc. If desired, circuitry 30 may include wired and/or wireless communications circuitry. The communications circuitry may be used to support communications over one or more wired or wireless communications links. Wireless circuitry in circuitry 30 may include one or more antennas and one or more radio-frequency transceiver circuits. Wireless communications circuitry may be used to support wireless communications over cellular telephone bands, wireless local area network bands, near field communications bands, etc.

Device 10 may include input-output devices 32 to allow input to be gathered from a user, from the environment, or from external devices and to allow output to be supplied (e.g., to external equipment, to a user of device 10, etc.). Input-output devices 32 may, for example, include buttons, joysticks, scrolling wheels, touch pads, key pads, keyboards, microphones, speakers 34, tone generators, vibrators, cameras, a display such as display 14 and/or other light-emitting components, light-emitting diodes and other status indicators, data ports, etc.

Display 14 may be a liquid crystal display (e.g., a backlit display with a backlight unit formed from an edge-lit light guide layer or a direct-lit backlight with an array of light-emitting diodes), an organic light-emitting diode display, an array of crystalline semiconductor light-emitting diode dies, an electrophoretic display, or other suitable display. An array of pixels in display 14 forms an active area that extends across some or all of the front face of device 10 for displaying images. Device 10 may have an opposing rear face that is formed by a housing wall in housing 12. The array of pixels may have any suitable number of pixels (e.g., at least 10,000, at least 1,000,000, less than 100,000,000, etc.) and the pixels may be arranged in rows and columns. There may be any suitable number of rows and columns in display 14 (e.g., 100s of rows and/or columns, 1000s of rows and/or columns, etc.).

Input-output devices 32 may include sensors such as sensors 36. Sensors 36 may include microphones, force sensors, touch sensors, temperature sensors, air pressure sensors, moisture sensors, color-sensitive ambient light sensors (sometimes referred to as color ambient light sensors), and other light-based sensors, magnetic sensors, and sensors for measuring the orientation, movement, and/or position of device 10 such as inertial measurement units that include accelerometers, compasses, and/or gyroscopes. Sensors 36 may include light sources, image sensors, and/or other components for forming a gaze detection system (e.g., a system that monitors the position of a user's eyes).

Figure 2:
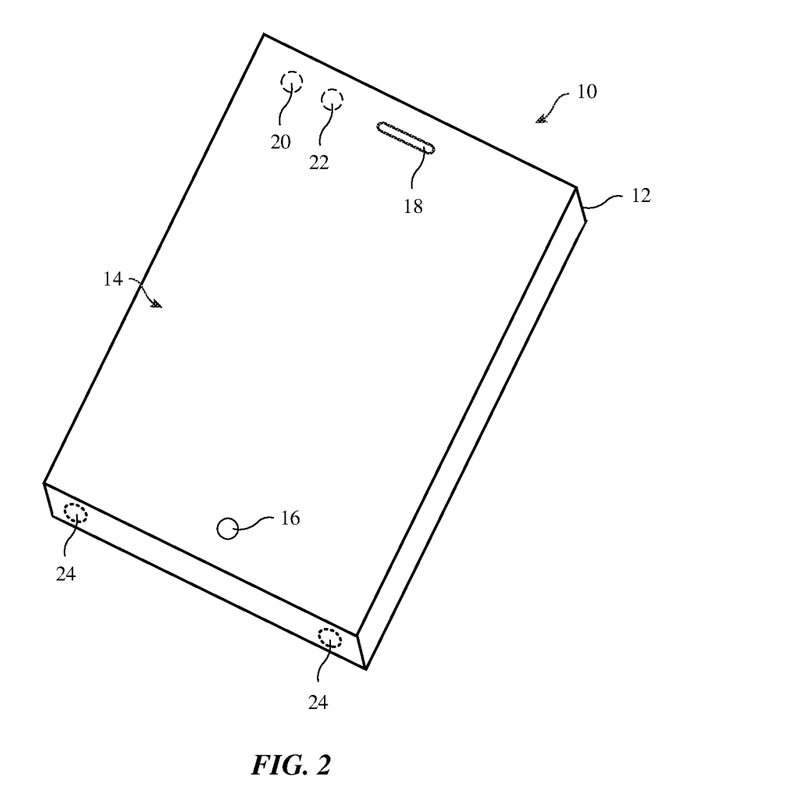
FIG. 2 is a perspective view of an illustrative electronic device in accordance with an embodiment.

A perspective view of an illustrative electronic device is shown in FIG. 2. In the example of FIG. 2, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button such as button 16, speaker port 18, and other components. If desired, a button such as button 16 may be formed under a display cover without forming an opening (e.g., when button 16 is formed from an optical sensor, capacitive sensor, force sensor, or other sensor that operates through the display cover layer). Openings may be formed in housing 12 to form communications ports (e.g., an audio jack port, a digital data port, etc.), to form openings for buttons, and/or to form openings for audio components. For example, microphones and speakers may be mounted in audio ports such as ports 24 or may be mounted elsewhere in device 10.

As shown in FIG. 2, device 10 may include optical windows such as windows 20 and 22. Windows such as windows 20 and 22 may be formed within the active area of display 14 or in an inactive border area that runs along one or more edges of the active area. Optical sensors may be mounted under windows such as windows 20 and 22. These sensors may include, for example, visible and/or infrared cameras (e.g., lenses and associated digital image sensors), a proximity sensor (e.g., a light-based proximity sensor), a color ambient light sensor, and/or other sensors that use light.

Figure 3:
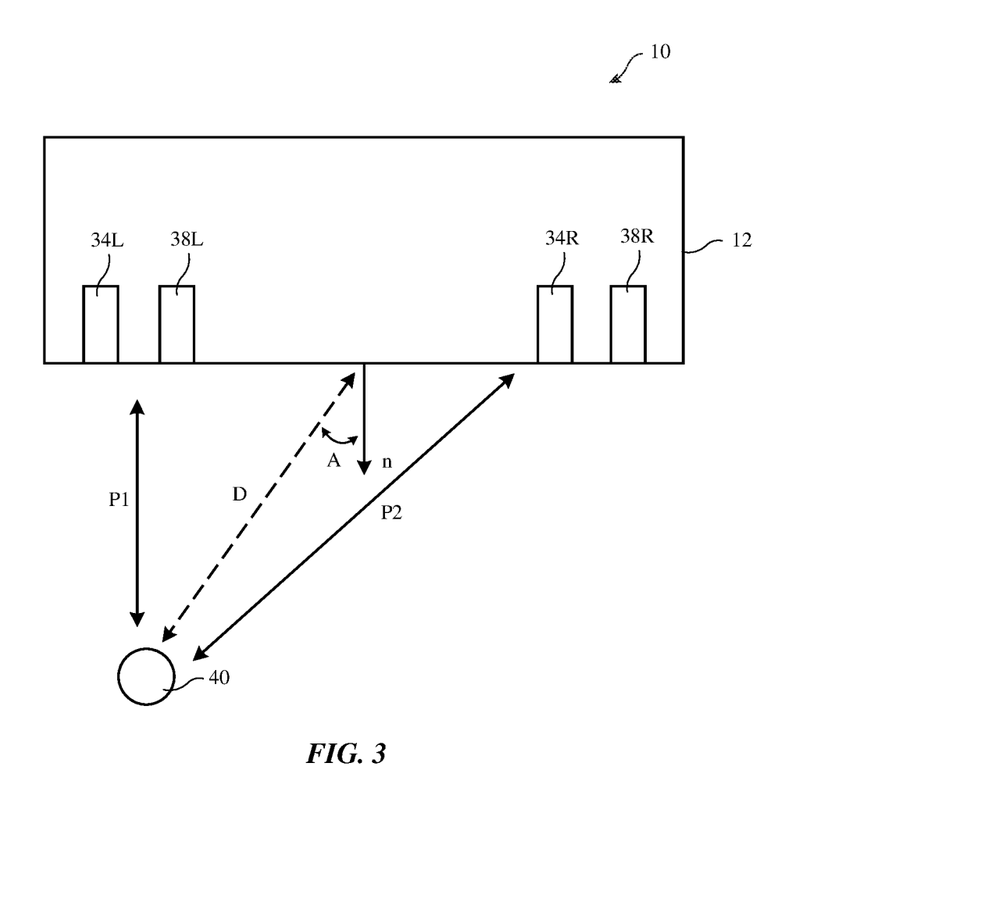
FIG. 3 is a top view of an illustrative electronic device with audio components in accordance with an embodiment.

FIG. 3 is a top view of an illustrative device having audio components such as speakers and microphones mounted in housing 12. In the example of FIG. 3, device 10 has a left speaker 34L and a right speaker 34R for providing stereo audio playback and has left microphone 38L and right microphone 38R for gathering sound in stereo.

As shown in FIG. 3, users such as illustrative user 40 may sometimes be located asymmetrically with respect to audio components. For example, user 40 may be located at a non-zero angle A with respect to surface normal n of housing 12 of device 10 so that there is a path length difference between the distance along path P1 between user 40 and the left audio components and the distance along path P2 between user 40 and the right audio components. As a result of the asymmetry in these path lengths, sound from speaker 34L will be louder and will reach user 40 sooner than sound from speaker 34R. Similarly, speech or other sound produced by user 40 will reach microphone 38L sooner and with more strength than microphone 38R.

Device 10 may include audio control circuitry that helps compensate for audio component performance variations due to path length differences associated with paths P1 and P2. For example, audio output for left and right channels can be adjusted to impart additional delay on the audio output signals that are arriving along the shorter path (e.g., along P1 in the example of FIG. 4) and to increase the volume of the audio output signals that are arriving along the longer path (e.g., along path P2 in the example of FIG. 4), thereby compensating for the user's orientation. Audio input channels can also be adjusted (e.g., by delaying incoming microphone signals associated with the shorter path P1 so that they are aligned in time with the microphone signals associated with longer path P2 and increasing the gain of the signals associated with the longer path P2 to equalize the measured audio signals).

Figure 4:
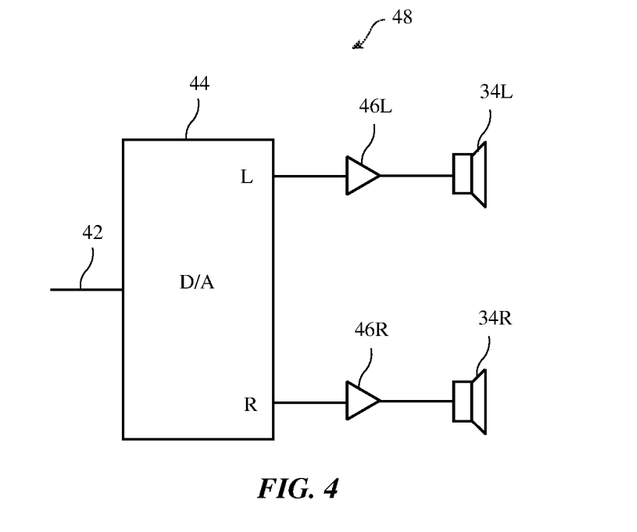
FIGS. 4 and 5 are schematic diagrams of illustrative audio circuitry in an electronic device in accordance with an embodiment.

FIG. 4 shows illustrative audio output circuitry that may be used to made adjustments to the right and left channels of audio output provided by device 10. As shown in FIG. 4, audio output circuitry 48 may receive audio tracks or other sound information digitally on input 42 of digital-to-analog converter 44. Control circuitry 30 may, for example, play back a song or other audio file and, during playback, may supply digital data corresponding to the audio file to input 42 of digital-to-analog converter 44. Converter 44 may have left and right channels that supply left amplifier 46L and right amplifier 46R with respective analog audio signals corresponding to the digital audio information received on input 42. Left amplifier 46L may supply audio signals to left speaker 34L so that left speaker 34L produces left-channel audio output (e.g., sound for the left channel of a stereo music track) and right channel amplifier 46R may supply audio signals to right speaker 34R so that right speaker 34R produces right-channel audio output (e.g., sound for the right channel of a stereo music track). If desired, audio output circuitry 48 may have additional circuitry and additional speakers for handling additional audio channels. The example of FIG. 4 is merely illustrative.

When it is determined that one of speakers 34L is closer to user 40 than the other, as described in connection with FIG. 3, circuitry 48 may make compensating adjustments. For example, the magnitude of the audio output associated with the longer speaker-to-user path length may be increased (e.g., digitally to the digital data being received by digital-to-analog converter 44 and/or in an analog fashion by adjusting the output gain of the audio output amplifier that is associated with the longer path). Relative delay between the audio output channels can likewise be compensated by adding a delay to the channel associated with the shorter path to ensure that audio output from both channels will reach user 40 simultaneously.

Figure 5:
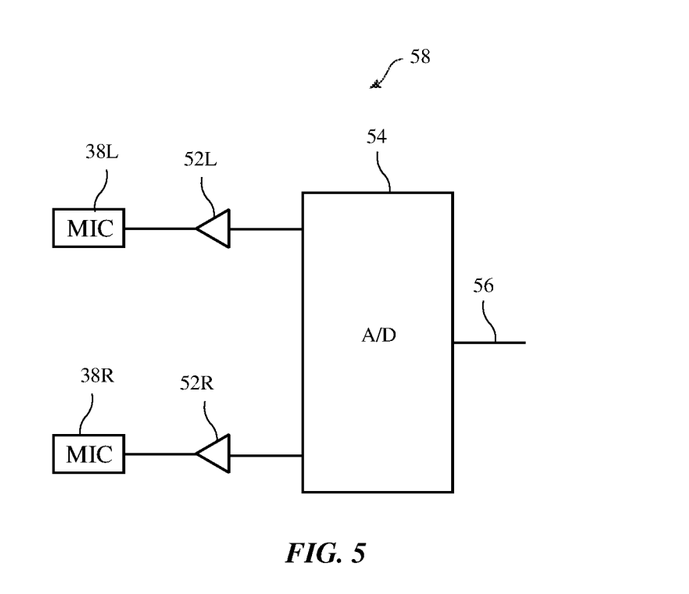

FIG. 5 shows illustrative audio input circuitry that may be used to make adjustments to the right and left channels of audio input (sound measurements) gathered by device 10. As shown in FIG. 5, audio input circuitry 58 may gather measurements on sound in the environment surrounding device 10 (e.g., speech from user 40) using microphones 38L and 38R, input amplifiers 52L and 52R, and analog-to-digital converter 54. Corresponding digitized output for use by control circuitry 30 may be supplied on output 56 of circuitry 58. Control circuitry 30 may, for example, process gathered audio to identify voice commands.

When making audio measurements using audio input circuitry 58, the gain of amplifiers 52L and 52R can be adjusted to increase the relative gain for the channel for which the path between the user and microphone is greatest. For example, if user 40 is located closer to left microphone 38L than right microphone 38R, the gain of input amplifier 52R may be increased relative to input amplifier 52L to compensate and/or compensating gain adjustments can be made digitally to the digitized version of the measured left and right audio that is being handled by analog-to-digital converter. A compensating time delay may also be added to the measured signal for the shorter path using circuitry 58.

The compensating adjustments that are made using audio output circuitry 48 and audio input circuitry 58 may be made based on sensor data from sensors 36 in real time, thereby helping to maintain desired levels of audio performance, even as user 40 moves to various different orientations with respect to the left-channel audio components and the right-channel audio components.

Figure 6:
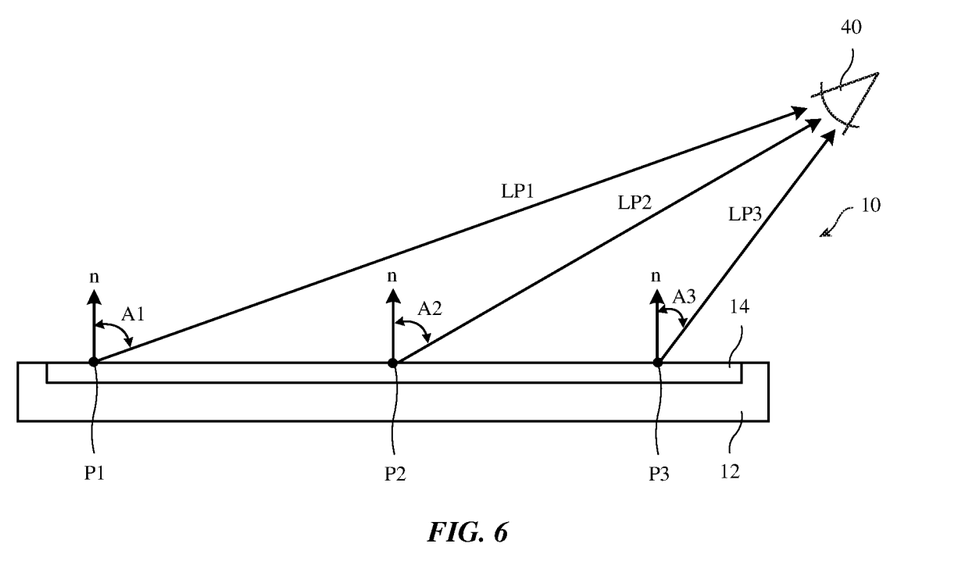
FIG. 6 is a side view of an illustrative device with a display showing how a user's angle of view of pixels in the display may vary as a function of pixel location within the display in accordance with an embodiment.

Adjustments may also be made to the images being displayed on display 14 to account for variations in pixel performance as a function of orientation relative to user 40. As shown in the cross-sectional side view of device 10 of FIG. 6, pixels in different areas of display 14 may exhibit different orientations relative to user 40. As an example, a light ray LP1 from left-hand pixel P1 that is viewed by user 40 may be characterized by an angle A1 relative to display surface normal n of display 14, a light ray LP2 from central pixel P2 that is viewed by user 40 may be characterized by an angle A2 relative to display surface normal n of display 14, and a light ray LP3 from right-hand pixel P3 that is viewed by user 40 may be characterized by an angle A3 relative to display surface normal n of display 14.

Due to non-uniformity in the output characteristics of the pixels of display 14 as a function of viewing angle (e.g., variations due to the structures used in organic light-emitting diode pixels, liquid crystal display pixels, etc.), there may be visible differences (e.g., undesired color casts and/or variations in light intensity) in the light from pixels at different locations. For example, a user such as user 40 who is viewing a image on display 14 may perceive that the pixels at locations P1, P2, and P3 have three different color casts relative to neutral (all of which may differ from the color cast associated with on-axis light from the pixels of display 14). To dynamically adjust for these differences, the pixel value for each pixel (or group of pixels) in display 14 may be adjusted before loading this data into the pixels of display 14. The amount of modification to be made to each pixel value can be determined based on calibration information stored in circuitry 30. This calibration information may be gathered during manufacturing (e.g., by measuring the angular dependence of the color and luminance of display 14 with testing equipment). Dynamic pixel value modifications to correct for angle-of-view-dependent appearance variations may be made based on sensor data or other data that reveals the orientation (e.g., angles A1, A2, A3 in the example of FIG. 6) of user 40 to the pixels of display 14.

Figure 7:
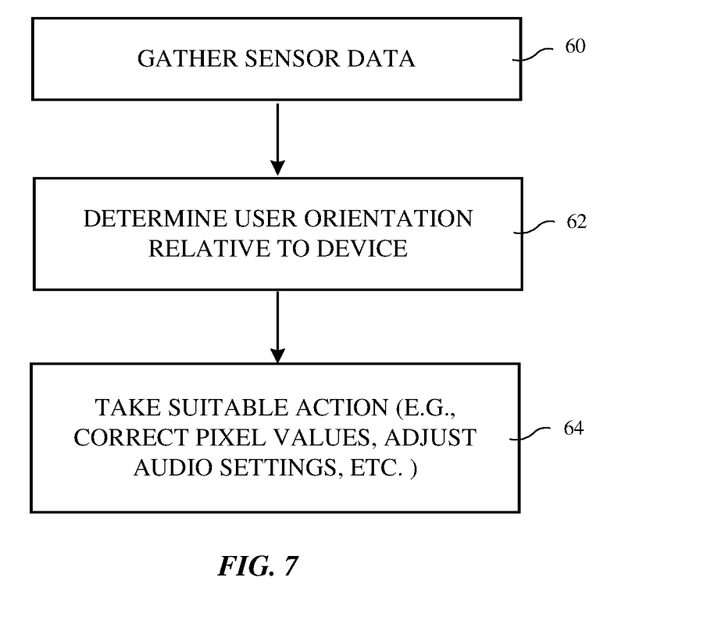
FIGS. 7 and 8 are flow charts of illustrative operations involved in operating an electronic device in accordance with an embodiment.

FIG. 7 is a flow chart of illustrative operations involved in modifying audio content and image content in device 10 to compensate for changes in the orientation of user 40 to audio and display components in device 10.

During the operations of block 60, sensor information may be gathered from cameras (e.g., visible and/or infrared cameras), inertial measurement units (e.g., gyroscopes, accelerometers, and/or compasses), and/or other sensors.

The sensor information from block 60 may be processed during the operation of block 62 to determine the current orientation of the user relative to device 10 (and thereby the orientation of user 40 to speakers, microphones, display pixels, etc. in device 10).

During the operations of block 64, action may be taken based on the orientation of the user relative to device 10. For example, audio output may be modified as described in connection with FIG. 4, audio input may be modified as described in connection with FIG. 5, and/or display data for display 14 may be modified as described in connection with FIG. 6.

With the arrangement of FIG. 7, orientation information can be gathered by capturing periodic images (e.g., visible and/or infrared images) of the user (e.g., the user's eyes) with a camera or other sensor circuitry and processing this orientation data to determine the angular orientation and/or distance of user 40 to device 10. The power expended by capturing frequent images and processing these images to determine the user's orientation relative to device 10 may be reduced by capturing images less frequently (e.g., once per 250 ms or other suitable period of time) and using gyroscope data to track movements of device 10 during intervals between successive image capture operations. Gyroscopic tracking (or other motion tracking such as tracking based on accelerometer data, compass data, and/or other position data gathered by one or more sensors 18 in device 10) may be used to help accurately track the user's current orientation relative to device 10 in the event of a sudden movement of device 10 (e.g., a movement on the time scale of 50 ms or other rapid movement that would not otherwise be tracked in the interval between successive image capture events with a camera or gaze tracking system).

If desired, other techniques may be used to gather information on the user's orientation relative to device 10 (e.g., measurements with two or more cameras to produce a three-dimensional image of user 40, measurements with ultrasonic sensors, laser detecting and ranging sensors, radio-frequency sensors, etc.). The use of periodic image capture operations to update orientation information obtained by gyroscopic tracking of the orientation of device 10 that estimates the current orientation of device 10 relative to user 40 is merely illustrative.

In arrangements in which user 40 is not expected to look at device 10 during use (e.g., when device 10 does not include a display), information on the orientation of user 40 to device 10 may, if desired, be gathered using audio processing techniques rather than image capture techniques (e.g., by processing the audio input on the left and right microphone channels to provide user motion and orientation tracking, etc.) or other processing techniques that do not necessarily rely on visual measurements of the user and/or measurements of the movement of device 10.

Figure 8:
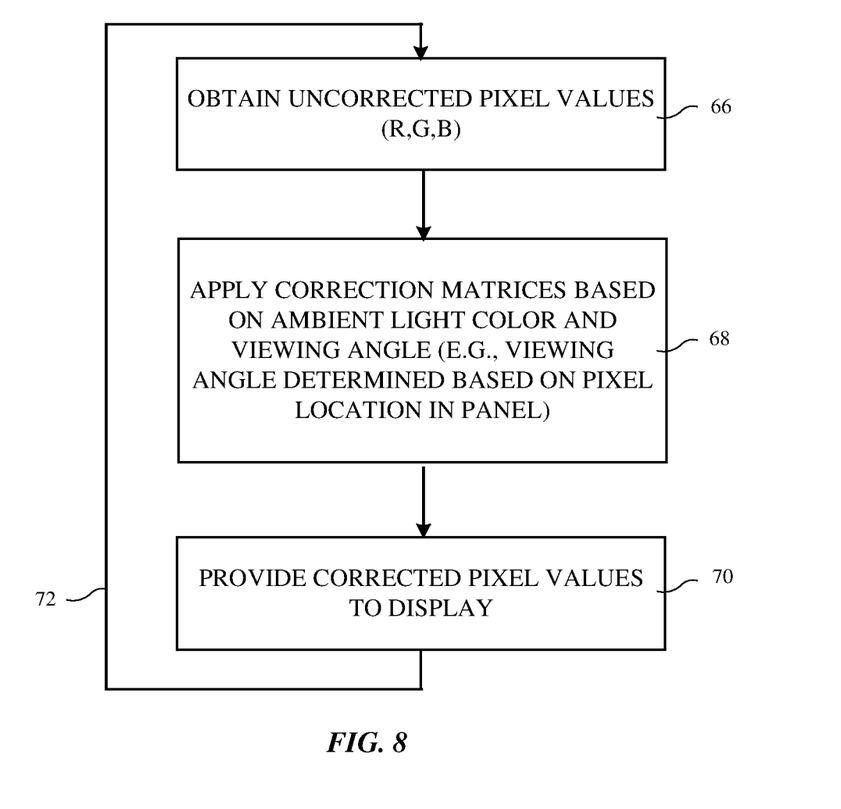

FIG. 8 is a flow chart of illustrative operations involved in modifying pixel values for the image data being loaded into display 14 to compensate for the orientation of user 40 relative to display 14 (e.g., the orientation of the user's eyes relative to the surface normal n of display 14). These compensating operations may be performed for all of display 14 globally (e.g., by treating pixels P1, P2, and P3 equally in display 14 of FIG. 6) or may be performed differently for different pixels across the display, thereby ensuring that each pixel (or block of similarly located pixels) will be modified by an appropriate amount.

During the operations of block 66, control circuitry 30 (e.g., pixel pipeline processing circuitry in a graphics processing unit in control circuitry 30, etc.) may obtain uncorrected image data (e.g., uncompensated pixel values [R, G, B]) for each pixel in display 14 from a content source (e.g., a media file containing static and/or time-varying images).

During the operations of bock 68, control circuitry 30 may adjust the pixel values to compensate for the different angles of view of the user relative to each of the pixels of display 14. These adjustments may be performed on a per-pixel basis and/or may be performed on blocks of pixels. With one illustrative compensation technique, control circuitry 30 computes the value of each updated (corrected) pixel [R', G', B'] using equation 1

$$[R',G',B']=M1*M2*[R,G,B] \quad (1)$$

In equation 1, M1 and M2 are 3×3 correction matrices and may be multiplied against uncorrected pixel values [R, G, B] to produce corrected (compensated) pixel values [R', G', B'] using pixel pipeline circuitry in circuitry 30 (e.g., graphics processing unit circuitry for performing matrix multiplication and other pixel data processing operations).

Correction matrix M1 may be used to compensate pixel values for changes in ambient light color. Ambient light color measurements may, for example, be made with a color ambient light sensor in device 10 and an appropriate compensation matrix M1 may be selected from a look-up table in circuitry 30 based on the measured color of the ambient light. For example, a color-sensing ambient light sensor reading may be used to determine whether device 10 is being used in a warm-lighting indoor environment (in which case pixels in display 14 should be shifted to warmer colors to compensate) or is being used in a cool-lighting outdoor environment (in which case pixels in display 14 should be shifted to cooler colors to compensate).

Correction matrix M2 may be multiplied against uncorrected pixel [R, G, B] to correct for angle-of-view effects. To satisfactorily apply matrix M2 in a large display where different pixel location in the display are characterized by different orientation angles with respect to user 40 (see, e.g., angles A1, A2, and A3 of FIG. 6), a series of corrective matrices M2 may be stored in a look-up table in storage in device 10 based on calibration measurements made on display 14 (or a representative display) during manufacturing. Each look-up table entry may correspond to a different block of pixel locations on display 14. Display 14 may, as an example, be divided into an array of M×N blocks of pixels and each block may have an associated position (in lateral dimensions X and Y across display 14). When correcting a given pixel in the center of a block, the corrective matrix M2 for that block may be used (e.g., by retrieving this matrix from the look-up table). If desired, interpolation techniques may be used to determine the appropriate correction matrix values to use in scenarios in which a given pixel that is being corrected lies between two adjacent block centers rather than being located at the center of a block. In addition to multiplying the uncorrected pixel value by matrices M1 and M2 using equation 1, control circuitry 30 may perform normalization operations (e.g., to avoid truncation).

After correcting the values of a group of pixels during the operations of block 68, control circuitry 30 may provide display 14 with corrected pixel values [R', G', B']. The corrected pixel values (e.g., pixels corresponding to a frame of image data or other suitable image data, etc.), may be provided to display 14 during the operations of block 70 (e.g., by loading each of the pixels in the pixel array of display 14). If desired, the color and intensity adjustments that are made to accommodate angle-of-view-dependent appearance variations may include global adjustments. In an adjustable-backlight-color backlit liquid crystal display, global adjustments may involve adjusting the color of the backlight. With corrected pixel values in place, the pixels of display 14 may provide light output with color and luminance attributes that are not adversely affected by the orientation of display 14 relative to user 40. As indicated by line 72, processing may loop back to block 66 after block 70, so that additional pixels may be processed.

The foregoing is merely illustrative and various modifications can be made to the described embodiments. The foregoing embodiments may be implemented individually or in any combination.

What is claimed is:

1. An electronic device, comprising:
   a housing having an orientation;
   sensor circuitry configured to track changes to the orientation of the housing, wherein the sensor circuitry comprises a motion sensor configured to track the changes to the orientation of the housing and a camera;
   a display; and
   control circuitry configured to make color corrections to pixels in the display based at least partly on the tracked changes to reduce angle-of-view dependent variations in pixel color cast, wherein the control circuitry is configured to make the color corrections based at least partly on images captured by the camera, wherein the images comprise images of a user's eyes, and wherein the control circuitry is configured to make the color corrections based on changes to the orientation of the housing measured with the motion sensor in intervals between successive images captured by the camera.

2. The electronic device defined in claim 1 wherein the sensor circuitry comprises a gyroscope configured to measure the changes to the orientation of the housing.

3. The electronic device defined in claim 1 wherein the motion sensor is selected from the group consisting of: an accelerometer and a compass.

4. The electronic device defined in claim 1 wherein the control circuitry is further configured to make the color corrections based at least partly on locations of the pixels within the display.

5. The electronic device defined in claim 1 further comprising a color-sensing ambient light sensor, wherein the control circuitry is further configured to make the color corrections based on ambient light measurements made with the color-sensing ambient light sensor.

6. The electronic device defined in claim 1 further comprising at least first and second speakers that produce sound in respective first and second audio channels, wherein the control circuitry is further configured to adjust the sound of the first and second audio channels based at least partly on the tracked changes.

7. The electronic device defined in claim 1 further comprising at least first and second microphones that measure respective first and second audio channels of microphone data, wherein the control circuitry is further configured to adjust the first and second channels of microphone data based at least partly on the tracked changes.

8. The electronic device defined in claim 1 wherein the color corrections are made by adjusting a color of a backlight.

9. An electronic device, comprising:
a housing;
a camera configured to capture images;
a motion sensor configured to measure changes to an orientation of the housing in intervals between successive images captured by the camera;
a display in the housing that has an array of pixels configured to display images; and
control circuitry configured to modify pixel values for the pixels in different areas of the array differently to reduce angle-of-view-dependent variations in pixel color cast appearance, wherein the control circuitry is configured to process the images captured by the camera to update the changes to the orientation measured with the motion sensor and wherein the control circuitry is configured to modify the pixel values at least partly in response to the measured changes to the orientation of the housing.

10. The electronic device defined in claim 9 wherein the motion sensor is selected from the group consisting of: an accelerometer and a compass.

11. The electronic device defined in claim 9 wherein the motion sensor comprises a gyroscope.

12. The electronic device defined in claim 9 further comprising:
first and second speakers and respective first and second audio amplifiers coupled respectively to the first and second speakers, wherein the control circuitry is further configured to adjust relative gain between the first and second audio amplifiers based at least partly on the measured changes to the orientation.

13. The electronic device defined in claim 9 wherein the display comprises an organic light-emitting diode display.

14. The electronic device defined in claim 9 further comprising a color ambient light sensor, wherein the control circuitry is configured to modify the pixel values based at least partly on information from the color ambient light sensor.

15. The electronic device defined in claim 14 wherein the camera captures eye position information and wherein the control circuitry is configured to update the changes to the orientation based at least partly on the captured eye position information.

16. The electronic device defined in claim 9 wherein the modified pixel values include modified RGB values.

17. An electronic device, comprising:
a housing having an orientation;
an array of pixels configured to display images;
a motion sensor;
a camera; and
control circuitry configured to modify pixel values for the pixels in the array to reduce angle-of-view-dependent pixel color cast variations, wherein the control circuitry is configured to modify the pixel values based on information from the motion sensor and the camera and wherein the control circuitry is configured to modify the pixel values based on changes to the orientation of the housing measured with the motion sensor in intervals between successive images captured by the camera.

18. The electronic device defined in claim 17 wherein the motion sensor comprises a sensor selected form the group consisting of: an accelerometer, a gyroscope, and a compass.

* * * * *

UNITED STATES PATENT AND TRADEMARK OFFICE
CERTIFICATE OF CORRECTION

PATENT NO. : 10,872,581 B2
APPLICATION NO. : 15/979324
DATED : December 22, 2020
INVENTOR(S) : Jiaying Wu et al.

Page 1 of 1

It is certified that error appears in the above-identified patent and that said Letters Patent is hereby corrected as shown below:

In the Claims

Column 10, Line 46, Claim 18: "form" should read -- from --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*